(12) United States Patent
Paterik et al.

(10) Patent No.: US 8,170,578 B1
(45) Date of Patent: May 1, 2012

(54) LOCATION REPORTING SYSTEM (75) Inventors: Thomas L. Paterik, Kansas City, MO (US); Wen Xue, Overland Park, KS (US); Saurindra M. Basu, Reston, VA (US)

(73) Assignee: Clearwire IP Holdings LLC, Bellevue, WA (US)

( * ) Notice: Subject to any disclaimer, the term of this patent is extended or adjusted under 35 U.S.C. 154(b) by 1037 days.

(21) Appl. No.: 11/970,652

(22) Filed: Jan. 8, 2008

(51) Int. Cl.
*H04W 24/00* (2009.01)
(52) U.S. Cl. .................................. 455/456.1
(58) Field of Classification Search .... 455/456.1–456.5, 455/432.1, 560, 433, 414.1, 432.3, 404.1; 370/338, 252, 354, 352, 356, 401, 353, 355
See application file for complete search history.

(56) References Cited

U.S. PATENT DOCUMENTS

| | | | | |
|---|---|---|---|---|
| 6,901,262 B2 * | 5/2005 | Allison et al. | ............. | 455/456.1 |
| 7,720,489 B2 * | 5/2010 | Engelhart, Sr. | ............. | 455/456.5 |
| 2003/0104822 A1 * | 6/2003 | Bentley | ..................... | 455/456 |
| 2006/0276196 A1 * | 12/2006 | Jiang et al. | ..................... | 455/446 |
| 2007/0275743 A1 * | 11/2007 | Lovell | ........................ | 455/466 |

* cited by examiner

*Primary Examiner* — Melody Mehrpour
(74) *Attorney, Agent, or Firm* — O'Brien Jones PLLC (57) ABSTRACT

A communication system receives a registration message from a device that identifies a location of the device and a device identifier. The system transmits the location of the device to a location database. The system receives a watch list that identifies a plurality of devices. The system also receives a session request from the device for a session. The system processes the device identifier to determine if the device is a one of the plurality of devices. In response to determining that the device is one of the plurality of devices, the system transfers the location of the device from the location database to a location reporting system.

20 Claims, 7 Drawing Sheets

LOCATION REPORTING SYSTEM

OVERVIEW

Wireless telecommunication carriers are required by government laws and regulations to provide certain information to law enforcement agencies (LEAs) in order to comply with court ordered or approved surveillance requests. For example, the Communications Assistance for Law Enforcement Act (CALEA) requires that carriers have the ability to provide " . . . information that identifies the origin, direction, destination, or termination of a communication . . . ." When applied to wireless mobile phones, this clause has been construed to mean at least the cell tower and cell sector used by a monitored communication.

Wireless carriers may also have their own reasons for associating the cell tower and cell sector with a communication session. For example, a wireless carrier may examine the cell tower and cell sector information to detect a device that appears to be in two different places at once. Since this is not likely, if not impossible, it may be concluded that at least one of the signals that appear to be coming from this device is from a fraudulent source.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

In an embodiment, a communication system receives a registration message from a device that identifies a location of the device and a device identifier. The system transmits the location of the device to a location database. The system receives a watch list that identifies a plurality of devices. The system also receives a session request from the device for a session. The system processes the device identifier to determine if the device is a one of the plurality of devices. In response to determining that the device is one of the plurality of devices, the system transfers the location of the device from the location database to a location reporting system.

Figure 1:
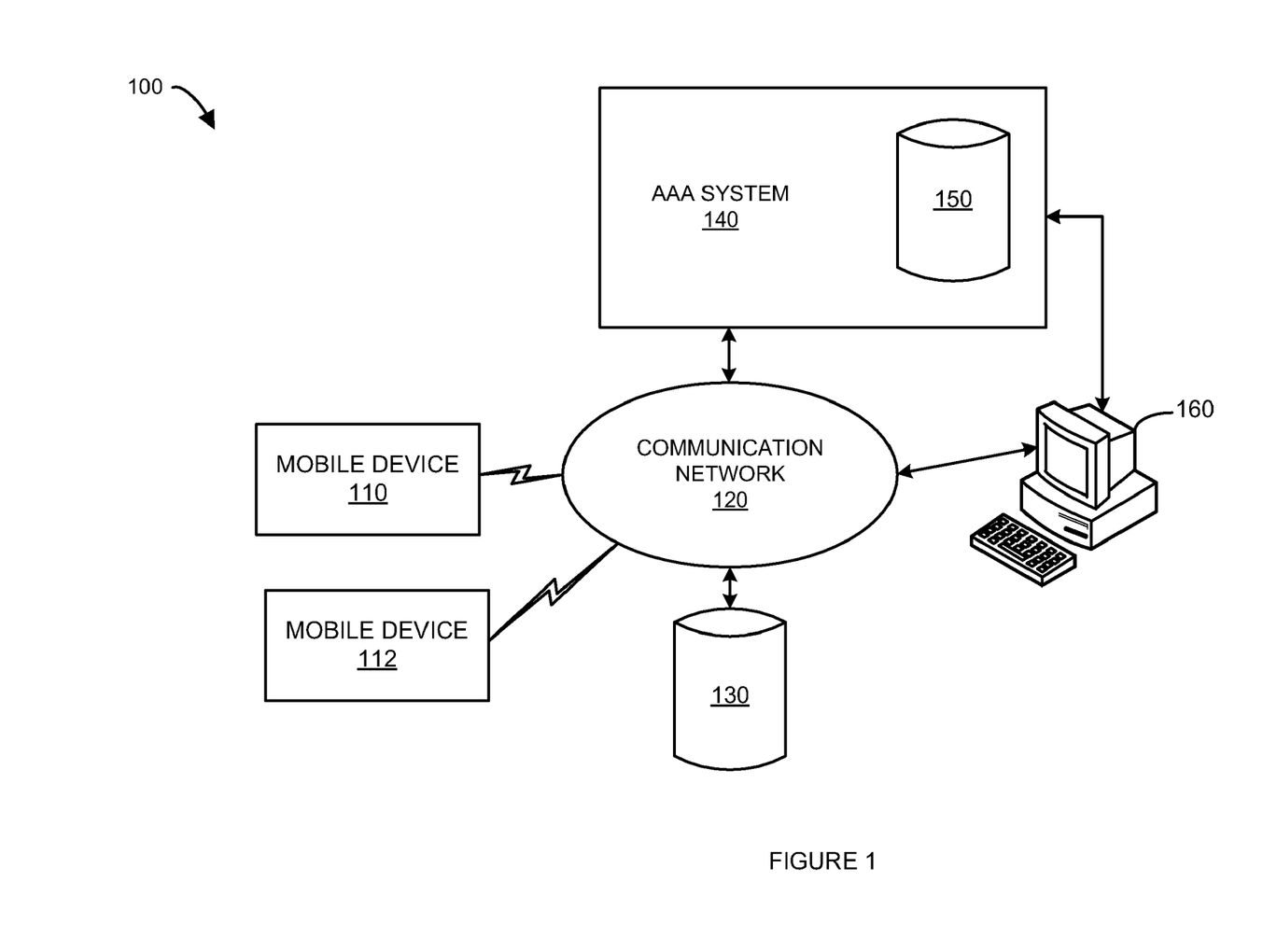
FIG. 1 is a block diagram illustrating a system that reports location information.

FIG. 1 is a block diagram illustrating a system that reports location information. In FIG. 1, communications system 100 comprises mobile device 110, mobile device 112, communication network 120, authentication, authorization, and accounting (AAA) system 140, database 130, and computer system 160. AAA system 140 includes database 150. Mobile device 110 and mobile device 112 are both operatively coupled to communication network 120. Communication network 120 is operatively coupled to AAA system 140. Communication network 120 is also operatively coupled to computer system 160. Database 130 is operatively coupled to communication network 120. Computer system 160 is operatively coupled to AAA system 140. Since AAA system 140 includes database 150, and communication network 120 and computer system 160 are both operatively coupled to AAA system 140, communication network 120 and computer system 160 are operatively coupled to database 150.

Communication network 120 could be any network or collection of networks that couple, link, or otherwise operatively connect mobile device 110 or 112 with other devices or systems. Communication network 120 is also operatively coupled to database 130. For example, communication network 120 may operatively couple mobile device 110 to mobile device 112 for voice communication. This voice communication may be carried via data packets using voice over internet protocol (VoIP) or some other voice over packet (VOP) protocol.

It should be understood that communication network 120 may also connect mobile device 110 or 112 to computer system 160, computer system 160 to AAA system 140, and computer system 160 to database 130. In addition, database 130 may be part of, or stored on, an element of communication network 120. However, other secondary data networks could be used. In an example, communication network 120 may include a backhaul network, a local network, a long distance network, or a packet network, or any combination thereof, as well as other types of networks.

In an example, communication network 120 may be, or include all or parts of an IEEE 802.16 (WiMAX) specified system. These parts include a base station (BS); an access services network (ASN), or connectivity service network (CSN). In another example, AAA system 140 may also be a part of a WiMAX specified system. In another example, database 130 is stored on, or part of, an ASN.

AAA system 140 may be any system or collection of systems, such as database 150, capable of storing and retrieving location information. In an example, AAA system 140 is part of a CSN and performs authentication, authorization, and accounting operations. AAA system 140 may manage user or device profiles for authentication (e.g. verifying device identifier, user name, or password).

AAA system 140 may also provide configuration information to communication network 120 that specifies the type of service to deliver, and policies to enforce that may restrict access by, or services provided to, mobile devices 110 and 112. For example, when mobile device 110 first couples to communication network 120, mobile device 120 may send a registration message to communication network 120 asking for permission to use communication network 120 to communicate to other systems. The registration message may include a device identifier. Communication network 120 may then forward that registration message, along with a device identifier and location information such as a tower identification and cell sector identification, to AAA system 140. AAA system 140 may then store that information, including location information, in database 150 and may also determine if mobile device 110 may use communication network 120.

AAA system 140 may then inform communication network 120 whether mobile device 110 may use communication network 120.

It should also be understood that AAA system 140 may include additional elements not pictured for the sake of clarity. A device identifier may be one or more, but is not limited to, a mobile phone number, a mobile directory number (MDN), mobile identification number (MIN), electronic serial number (ESN), medium access control address (MAC address), or internet protocol address (IP address). Other types of device identifiers are also possible.

Communication network 120 may process session requests from mobile devices 110 or 112. These session requests may, for example, comprise a request for a VOP session to initiate audio communications between mobile device 110 and another entity such as mobile device 110. In another example, a session request may be for a VoIP session to initiate audio communications with an entity not part of communications system 100. Other session types are possible such as, but not limited to, web access sessions, video conference sessions, internet chat sessions, email, direction-locations sessions, global positioning session, and text messaging sessions.

Communication network 120 may process a session request to see if it involves an entity identified on database 130. For example, the session request may be for a VoIP call from 970-555-1234 to another number. If phone number 970-555-1234 was identified on database 130, communication network 120 would determine that the device that made the session request is one of the devices identified by database 130. In response to determining that a device that is identified by database 130 has made a session request, communication network 120 may initiate a process to transfer the location information. For example, communication network 120 may notify computer system 160. Computer system 160 may then request that AAA system 140 send it the part of database 150 that gives the location information associated with the device making the session request. AAA system 140 may then transfer that location information to computer system 160. Other information may also be transferred to computer system 160 in response to determining that a device that is identified by database 130 has made a session request. For example, the contents of the session may be transferred to computer system 160. These contents may be, for example, the digitized audio content of a VOP call.

Mobile devices 110 and 112 may be any device, system, or other such communication platform capable of communicating with communication network 120. Mobile device 110 or 112 may be, for example, a mobile phone, a wireless phone, a personal digital assistant (PDA), an internet phone, a laptop computer, computer system, or any combination thereof, as well as any other type of device or system. Other types of communication platforms are possible.

Computer system 160 may be any system or collection of systems capable of receiving a report containing location information. For example, computer system 160 may be a CALEA interface system capable of receiving tower identification and cell sector identification information associated with a communication session by mobile device 110 or 112. Computer system 160 may also be capable of requesting tower identification and cell sector identification information associated with a communication session from AAA system 140. In another example, computer system 160 may be a billing or fraud detection system capable of receiving a call detail record (CDR) that contains a tower identification and cell sector identification information. It should also be understood that computer system 160 may be integrated into, or part of, communication network 120 and/or AAA system 140.

Figure 2:
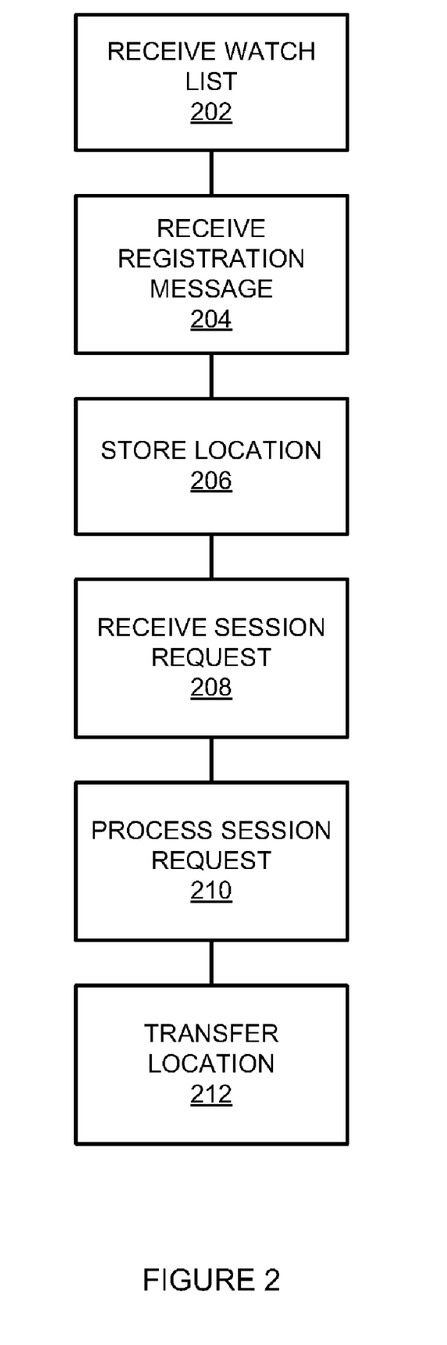
FIG. 2 is a flow chart illustrating a method for reporting location information.

FIG. 2 is a flow chart illustrating a method for reporting location information. The steps of FIG. 2 may be performed by communication system 100. In step 202, a watch list is received. This watch list may include, or be, a list with at least one device identifier such as, but not limited to, a mobile phone number, a mobile directory number (MDN), mobile identification number (MIN), electronic serial number (ESN), medium access control address (MAC address), or internet protocol address (IP address). Other types of device identifiers are also possible. The watch list may be stored in, for example, database 130. In another example, the watch list may be stored in an element of communication network 120 after communication network 120 receives watch list from database 130.

In step 204, a registration message is received. For example, this registration message may originate from mobile device 110 or 112 when mobile device 110 or 112 intends to connect to communication network 120. In another example, this registration message comes from an element of communication network 120 when, for example, mobile device 110 changes from communicating via one part of communication network 120 to communicating via another part of communication network 120. This registration message may include a device identifier and location information.

In step 206, location information is stored. This location information may, for example, include a tower identification and a cell sector identification. The location information may be stored, for example, by AAA system 140 in database 150. The stored location information may be associated with a device identifier.

In step 208, a session request is received. This session request may, for example, be a request for a VOP session to initiate audio communications between mobile device 110 and another entity such as mobile device 112. In another example, this session request may be for a VoIP session to initiate audio communications with an entity not part of communications system 100. Other session types are possible such as, but not limited to, web access sessions, video conference sessions, internet chat sessions, email, direction-locations sessions, global positioning session, and text messaging sessions.

In step 210, the session request is processed. The session request is processed to see if it involves an entity identified on the watch list received in step 202. For example, the session request may be for a VoIP call from 970-555-1234 to another number. If phone number 970-555-1234 was identified on the watch list, the processing of step 210 would determine that the device that made the session request in step 208 is one of the devices on the watch list.

In step 212, in response to a determination that a device making a session request is on the watch list, location information is transferred. For example, when communication network 120 determines that a device that is on the watch list made a session request, communication network 120 may notify computer system 160. Computer system 160 may then request that AAA system 140 send it the contents of database 150 that gives the location information stored in step 206. AAA system 140 may then transfer that location information to computer system 160. Other information may also be transferred to computer system 160 in response to a determination that a device making a session request is on the watch list. For example, the contents of the session may be transferred to computer system 160. These contents may be, for example, the digitized audio content of a VOP call.

Figure 3:
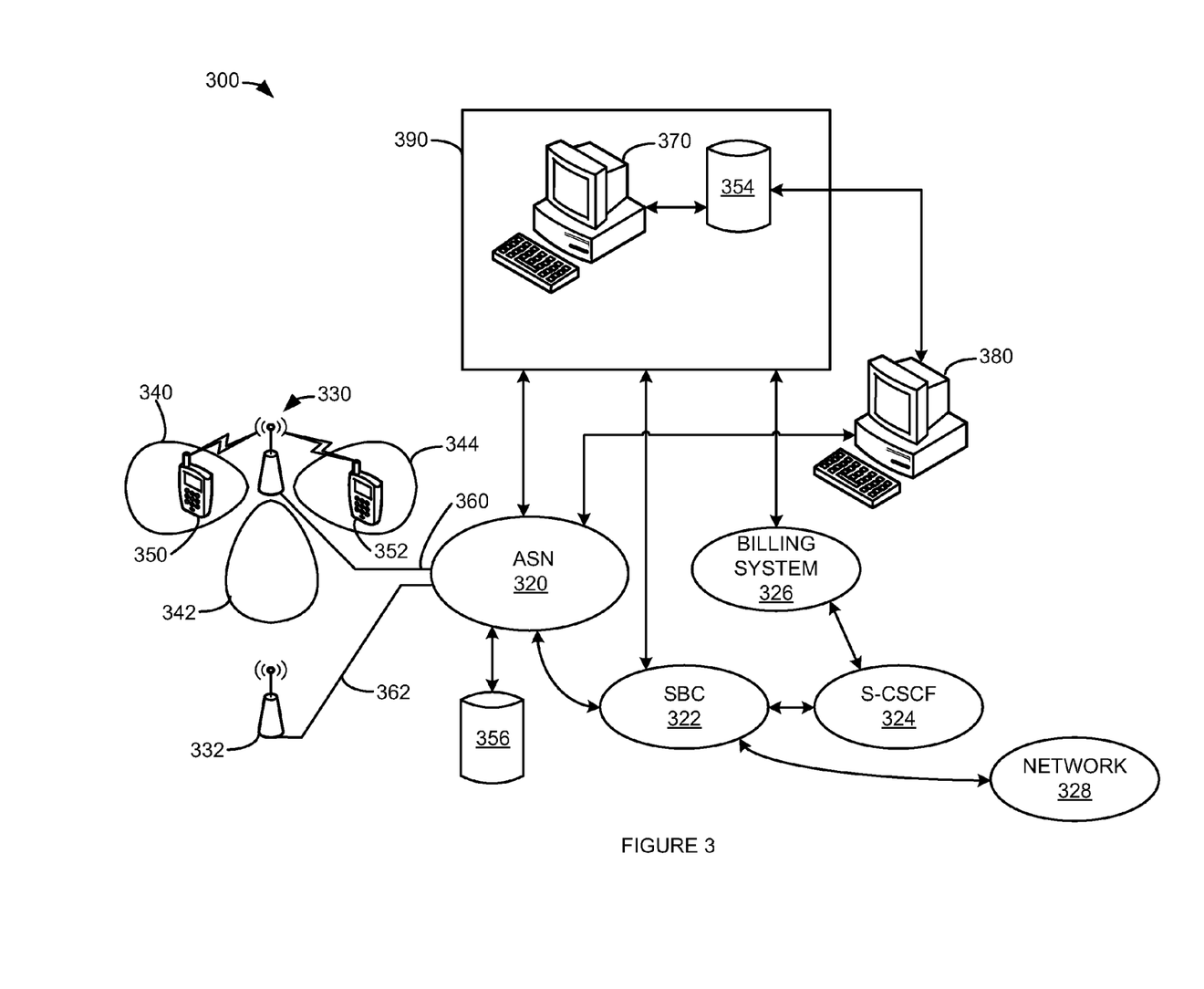
FIG. 3 is a block diagram illustrating a communications system that reports location information.

FIG. 3 is a block diagram illustrating a communications system that reports location information about communications involving a WiMAX specified system. In FIG. 3, WiMAX specified communications system 300 comprises ASN 320, session border controller (SBC) 322, serving call session control function (S-CSCF) 324, billing system 326, network 328, base stations 330 and 332, cell sectors 340, 342, and 344, mobile devices 350 and 352, communication links 360 and 362, interface computer 380, watch list 356, and AAA system 390. AAA system 390 comprises computer system 370 and location information 354.

ASN 320 is operatively coupled to AAA system 390, interface computer 380, watch list 356, and SBC 322. ASN 320 is also operatively coupled to base stations 330 and 332 by communication links 360 and 362, respectively. Base station 330 services cell sectors 340, 342 and 344. Mobile device 350 is in cell sector 340 and is operatively coupled to base station 330 via a wireless (e.g. radio) link. Mobile device 352 is in cell sector 344 and is operatively coupled to base station 330 via a wireless link. Accordingly, mobile devices 350 and 352 may be operatively coupled with ASN 320 via base station 330 and communication link 360. In addition, watch list 356 may be part of, or stored on, an element of ASN 320. Mobile devices 350 and 352 may also be operatively coupled with all of the other elements of communications system 300 via ASN 320 and one or more of the elements comprising communications system 300.

SBC 322 is operatively coupled to ASN 320, network S-CSCF 324, network 324, and AAA system 390. S-CSCF 324 is also operatively coupled to billing system 326. Billing system 326 is also operatively coupled to AAA system 390. Interface computer 380 is operatively coupled to AAA system 390. Since AAA system 390 includes computer system 370 and location information 354, ASN 320, SBC 322, billing system 326, interface computer 380, and any other element of communication system 300 may be operatively coupled to computer system 370 and location information 354.

ASN 320 could be any network or collection of networks that couple, link, or otherwise operatively connect mobile device 350 or 352 with other devices or systems and can receive watch list 356. For example, ASN 320 may operatively couple mobile device 350 to mobile device 352 via base station 330 and communication link 360 for voice communication. This voice communication may be carried via data packets using, for example, voice over internet protocol (VoIP) or other voice over packet protocol (VOP). It should be understood that ASN 320 may also connect mobile device 350 or 352 to interface system 380, SBC 322, or AAA system 390. ASN 320 may also connect mobile device 350 or 352 to network 328 or S-CSCF 324 via SBC 322. ASN 320 may also connect mobile device 350 or 352 to billing system 326 via AAA system 390 or via SBC 322 and S-CSCF 324. Other secondary data networks may also be used. In an example, communication system 300 may include a backhaul network, a local network, a long distance network, a packet network, the internet, or any combination thereof, as well as other types of networks.

AAA system 390 may be any system or collection of systems, such as capable of storing and retrieving location information 354. In an example, AAA system 390 is part of a CSN and performs authentication, authorization, and accounting operations. AAA system 390 may manage user or device profiles for authentication (e.g. verifying device identifier, user name, or password). AAA system 390 may also provide configuration information to network 300 that specifies the type of service to deliver, and policies to enforce that may restrict access by, or services provided to, mobile devices 350 and 352. For example, when mobile device 350 first couples to ASN 320, mobile device 350 may send a registration message to ASN 320 asking for permission to use communication system 300 to communicate to other systems. ASN 320 may then forward that registration message along with a device identifier and location information such as a base station identification and cell sector identification, to AAA system 390. AAA system 390 may then store that location information 354 and may also determine if mobile device 350 may use communication system 300. AAA system 390 may then inform ASN 320 whether mobile device 350 may use communication system 300. It should also be understood that AAA system 390 may include additional elements not pictured for the sake of clarity.

Mobile devices 350 and 352 may be any device, system, or other such communication platform capable of communicating with communication system 300. Mobile device 350 or 352 may be, for example, a mobile phone, a wireless phone, a personal digital assistant (PDA), an internet phone, a laptop computer, computer system, or any combination thereof, as well as any other type of device or system. Other types of communication platforms are possible. Mobile devices 350 and 352 may be associated with a device identifier.

Interface system 380 may be any system or collection of systems capable of receiving a report containing location information. For example, interface system 380 may be a CALEA interface system capable of receiving base station identification and cell sector identification information associated with a communication session by mobile device 350 or 352. It should also be understood that interface system 380 may be integrated into, or part of, one or more of the elements of communication system 300 including, but not limited to ASN 320 and/or AAA system 390.

Billing system 326 may be any system or collection of systems capable of receiving a call detail record containing location information. For example, billing system 326 may be computer system capable of receiving base station identification and cell sector identification information associated with a communication session by mobile device 350 or 352. It should also be understood that billing system 326 may be integrated into, or part of, one or more of the elements of communication system 300 including, but not limited to ASN 320 and/or AAA system 390.

ASN 320 may process session requests from mobile devices 350 or 352. These session requests may, for example, comprise a request for a VOP session to initiate audio communications between mobile device 350 and another entity such as mobile device 352. Such a request may use session initiation protocol (SIP). In another example, a session request may be for a VoIP session to initiate audio communications with an entity not part of communications system 100. Other session types are possible such as, but not limited to, web access sessions, video conference sessions, internet chat sessions, email, direction-locations sessions, global positioning session, and text messaging sessions.

ASN 320 may process a session request to see if it involves an entity identified on watch list 356. For example, the session request may be a SIP protocol request for a VoIP call from 970-555-1234 to another number. If phone number 970-555-1234 was identified on watch list 356, ASN 320 would determine that the device that made the session request is on watch list 356.

In response to determining that a device that is on watch list 356 has made a session request, ASN 320 may initiate a process to transfer the location information. For example, ASN 320 may notify interface system 380. Interface system 380 may then request that AAA system 390 send it the part of location information 354 that gives the location information associated with the device making the session request. This location information may comprise a base station identification and a cell sector identification. For example, in FIG. 3, the location information about mobile device 350 would associate mobile device 350 with base station 330 and cell sector 340. AAA system 390 may then transfer that location information to interface system 390. Other information may also be transferred to interface system 380 in response to determining that a device on watch list 356 has made a session request. For example, the contents of the session may be transferred to interface system 380. These contents may be, for example, the digitized audio content of a VOP call.

Figure 4:
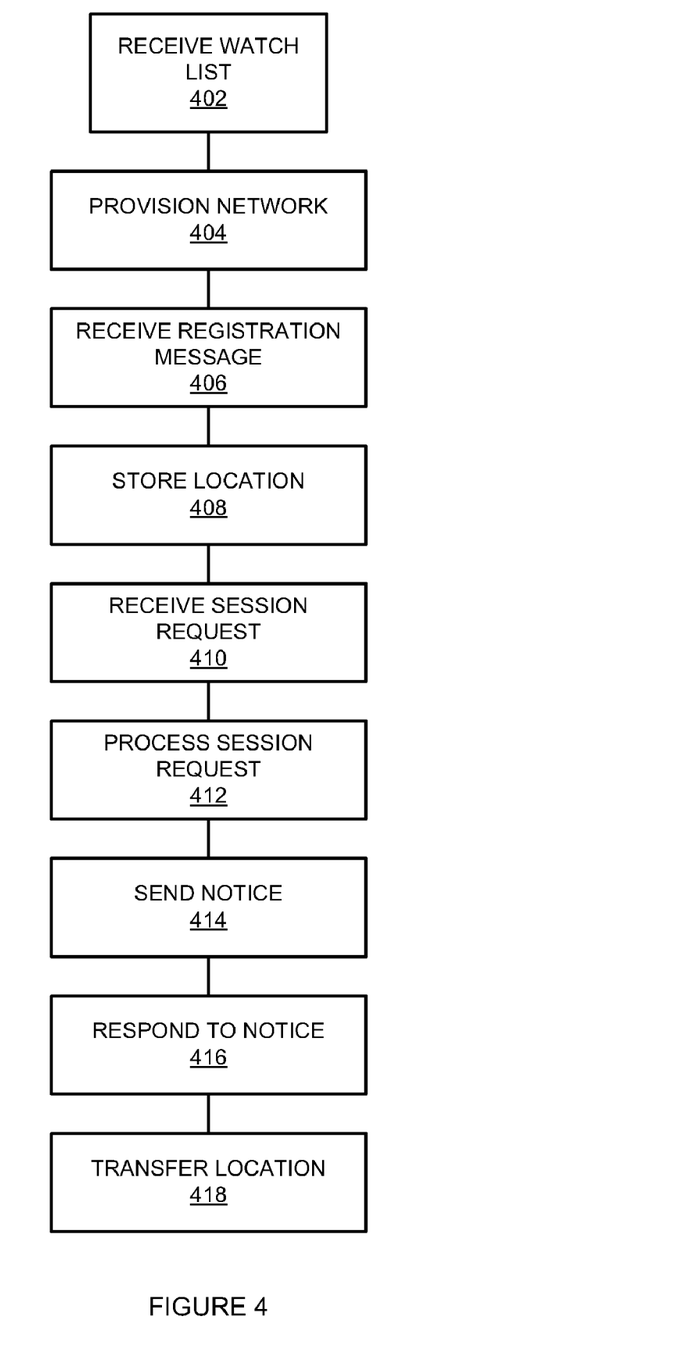
FIG. 4 is a flow chart illustrating a method for reporting location information.

FIG. 4 is a flow chart illustrating a method for reporting location information involving a WiMAX specified communication system. The steps of FIG. 4 may be performed by communication system 300 or 100. In step 402, a watch list is received. This watch list may include, or be, a list with at least one device identifier such as, but not limited to, a mobile phone number, a mobile directory number (MDN), mobile identification number (MIN), electronic serial number (ESN), medium access control address (MAC address), or internet protocol address (IP address). Other types of device identifiers are also possible. The watch list may be, for example, watch list 356.

In step 404, communication system 300 is provisioned with the watch list. For example, ASN 320 may be supplied with watch list 356. In another example, watch list 356 may be stored in an element of ASN 320 after communication system 300 receives a watch list in step 402.

In step 406, a registration message is received. For example, this registration message may originate from mobile device 350 or 352 when mobile device 350 or 352 intends to connect to communication system 300. In another example, this registration message comes from an element of communication system 300 when, for example, mobile device 352 changes from communicating via one part of communication system 300 to communicating via another part of communication system 300. For example, mobile device 352 may move from cell sector 344 to cell sector 342. This may cause mobile device 352 to send a registration message that is received by communication system 300. In another example, it may cause base station 330 to send a registration message. In another example, mobile device 352 may move from an area serviced by base station 330 to an area serviced by base station 332. This may cause mobile device 352 to send a registration message. In other examples, mobile device 352 moving from an area serviced by base station 330 to an area serviced by base station 332 may cause base station 330, 332, or both, to send a registration message. The registration message may include a device identifier.

In step 408, location information is stored. This location information may, for example, include a base station identification and a cell sector identification. The location information may be stored, for example, by AAA system 390. This location information may be associated with a device identifier.

In step 410, a session request is received. This session request may, for example, be a SIP protocol request for a VOP session to initiate audio communications between mobile device 350 and another entity such as mobile device 352. In another example, this session request may be for a VoIP session to initiate audio communications with an entity not part of communications system 300 such as a public switched telephone network (PSTN). Other session types are possible such as, but not limited to, web access sessions, video conference sessions, internet chat sessions, email, direction-locations sessions, global positioning session, and text messaging sessions.

In step 412, the session request is processed. The session request is processed to see if it involves an entity identified on the watch list received in step 402 and provisioned to communications network 300 in step 404. For example, the session request may be a SIP protocol request for a VoIP call from 970-555-1234 to another number. If phone number 970-555-1234 was identified on the watch list, the processing of step 412 would determine that the device that made the session request in step 410 is one of the devices on the watch list. The processing of step 412 may be performed by ASN 320.

In step 414, in response to a determination that a device making a session request is on the watch list, a notice is sent. For example, ASN 320 may send a notice to interface system 380. In another example, ASN 320 may send a notice to SBC 322 which may, in turn, send a notice to S-CSCF which may, in turn, send a notice to billing system 326.

In step 416, in response to a notice sent in step 414, an element of communication system 300 responds to that notice. For example, interface system 380 may respond to a notice it received in step 414 by requesting that AAA system 390 send it the contents of location information 354 that gives the location information stored in step 408. In other examples, ASN 320, SBC 322, S-CSCF 324, or billing system 326 may respond to a notice received in step 414 by requesting that AAA system 390 send the contents of location information 354 that correspond to the location information stored in step 408.

In step 418, location information is transferred. For example, AAA system 390 may then transfer location information to interface system 380. In other examples AAA system 390 may transfer location information to ASN 320, SBC 322, S-CSCF 324, or billing system 326. In addition, other information may also be transferred. For example, the contents of the session may be transferred to interface system 380. These contents may be, for example, the digitized audio content of a VOP call.

Figure 5:
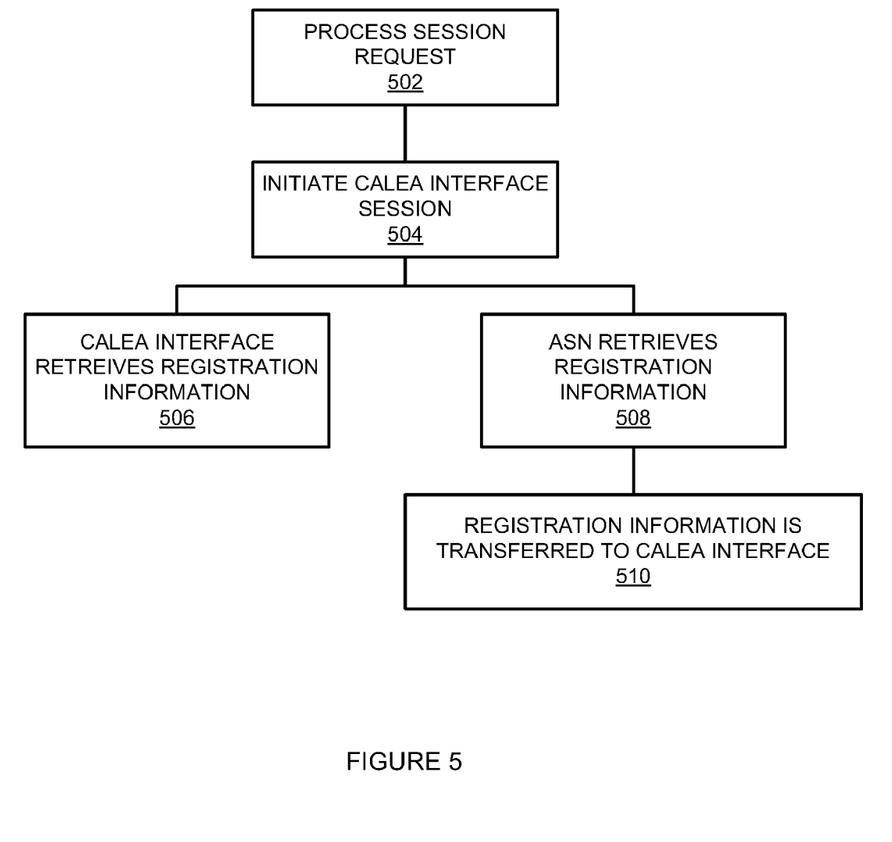
FIG. 5 is a flow chart illustrating two methods for retrieving location information.

FIG. 5 is a flow chart illustrating two methods for retrieving location information. In step 502, a session request is processed. Similar to step 412, the session request is processed to see if it involves an entity identified on a watch list provisioned to communications network 300. For example, the session request may be a SIP protocol request for a VoIP call from 970-555-1234 to another number. If phone number 970-555-1234 was identified on the watch list, the processing of step 502 would determine that the device that made the session request is one of the devices on the watch list. The processing of step 502 may be performed by ASN 320.

In step 504, a session is initiated with a CALEA interface system. CALEA interface system may be interface system 380. ASN 320 may be the initiator of the CALEA interface session.

In step 506, CALEA interface system retrieves registration information. This registration information may include location information 354 and may be associated with a particular device identifier. CALEA interface system may retrieve the registration information from AAA system 390. CALEA interface system may retrieve the registration information from AAA system 390 associated with a particular a device identifier. The registration information may include location information such as a base station identification and a cell sector identification. The registration information may also associate the registration information, and thus the location information, with a mobile device such as 350 or 352 using a device identifier. The registration information may also associate the registration information, and thus the location information, with the session request processed in step 502.

In an alternative to step 506, steps 508 and 510 may be performed. In step 508, an ASN retrieves registration information. The ASN retrieving the registration information may be ASN 320. This registration information may include location information 354. ASN 320 may retrieve the registration information from AAA system 390. A discussion of the registration information is given above in the discussion of step 506 so it will be omitted here for the sake of brevity. In step 510, the registration information is transferred to CALEA interface system.

Figure 6:
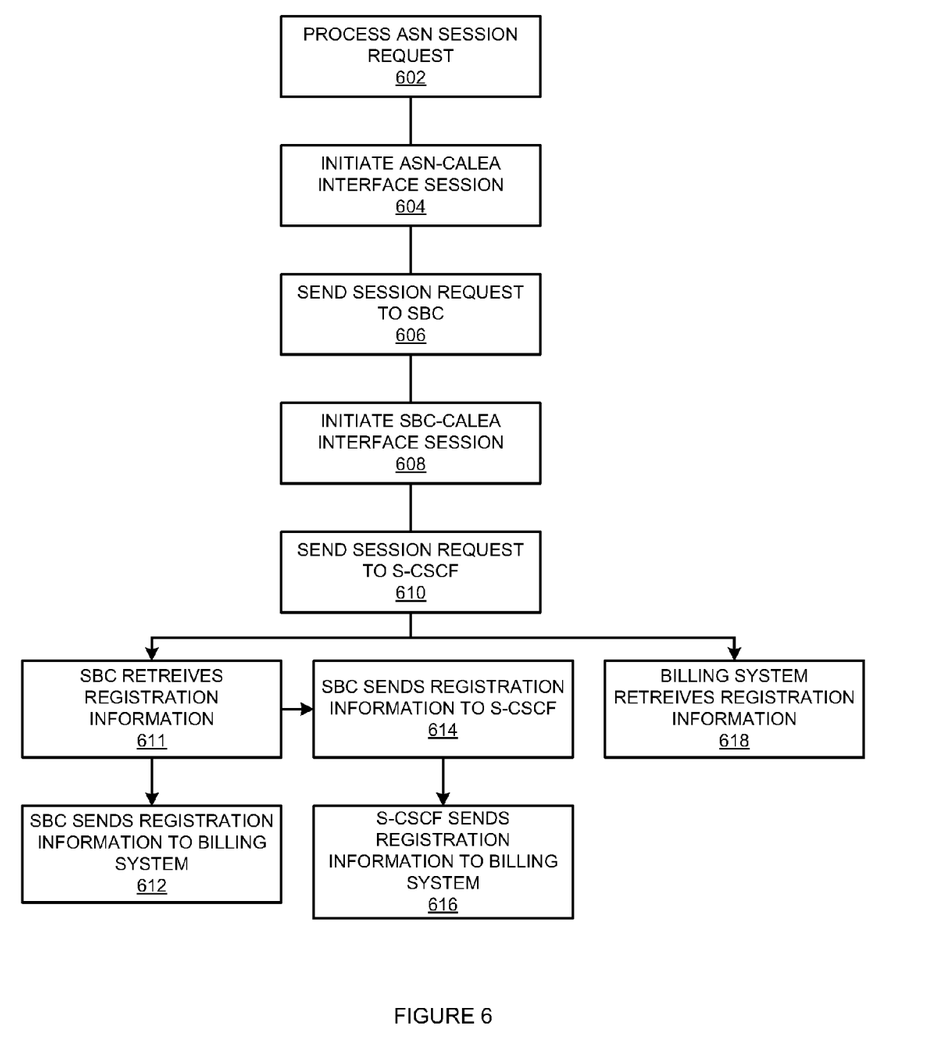
FIG. 6 is a flow chart illustrating three methods for retrieving location information.

FIG. 6 is a flow chart illustrating three methods for retrieving location information. In step 602, a session request received by an ASN is processed. Similar to step 412, the session request is processed to see if it involves an entity identified on a watch list provisioned to communications network 300. For example, the session request may be a SIP protocol request for a VoIP call from 970-555-1234 to another number. If phone number 970-555-1234 was identified on the watch list, the processing of step 602 would determine that the device that made the session request is one of the devices on the watch list. The processing of step 602 may be performed by ASN 320.

In step 604, an ASN to CALEA interface system session is initiated. CALEA interface system may be interface system 380. ASN 320 may be the initiator of the ASN-CALEA interface session. ASN-CALEA interface session may be used to send a notice to the CALEA interface that a session involving an entity on the watch list has been requested. In step 606, the session request is sent to a SBC. The SBC may be SBC 322. In step 608 an SBC to CALEA interface system session is initiated. CALEA interface system may be interface system 380. SBC 322 may be the initiator of the ASN-CALEA interface session. Alternatively, the CALEA interface system may be the initiator of the SBC-CALEA interface session. SBC-CALEA interface session may be used to send or receive a notice that a session involving an entity on the watch list has been requested.

In step 610, the session request is send to S-CSCF. From step 610, there are three alternate flows. The first flow is steps 611 and 612. The second flow is steps 611, 614, and 616. The third flow is step 618. These flows will each be discussed in turn, respectively.

In the first flow, in step 611 an SBC retrieves registration information. The SBC retrieving the registration information may be SBC 322. This registration information may include location information 354. SBC 322 may retrieve the registration information from AAA system 390. A discussion of the registration information is given above in the discussion of FIG. 5, step 506, so it will be omitted here for the sake of brevity. In step 612, the SBC send the registration information to a billing system. The billing system receiving the registration information, and thus location information, may be billing system 326.

In the second flow, in step 611 an SBC retrieves registration information. The SBC retrieving the registration information may be SBC 322. This registration information may include location information 354. SBC 322 may retrieve the registration information from AAA system 390. A discussion of the registration information is given above in the discussion of FIG. 5, step 506, so it will be omitted here for the sake of brevity. In step 614, the registration information is sent to a S-CSCF. This S-CSCF may be a part of the IP multimedia subsystem (IMS) and may be S-CSCF 324. The registration information, or the location information such as the base station identification and the cell sector identification, may be sent to the S-CSCF via P-Charging Vector headers. In step 616, the S-CSCF sends the registration information to a billing system. The billing system receiving the registration information may be billing system 326. The registration information, or the location information such as the base station identification and the cell sector identification, may be sent to the billing system via a call detail record (CDR).

In the third flow, in step 618 a billing system an SBC retrieves registration information. The billing system retrieving the registration information may be SBC 322. This registration information may include location information 354. Billing system 326 may retrieve the registration information from AAA system 390. A discussion of the registration information is given above in the discussion of FIG. 5, step 506, so it will be omitted here for the sake of brevity.

The methods and systems described above may be implemented with or executed by one or more computer systems. The methods described above may also be stored on a computer readable medium. Many of the elements of communication network 100 and communication network 300 may be, comprise, or include computers systems. This includes, but is not limited to mobile device 110, mobile device 112, communication network 120, AAA system 140, database 130, computer system 160, ASN 320, SBC 322, S-CSCF 324, billing system 326, network 328, base stations 330 and 332, mobile devices 350 and 352, communication links 360 and 362, interface computer 380, watch list 356, location information 354, computer system 370, and AAA system 390.

Figure 7:
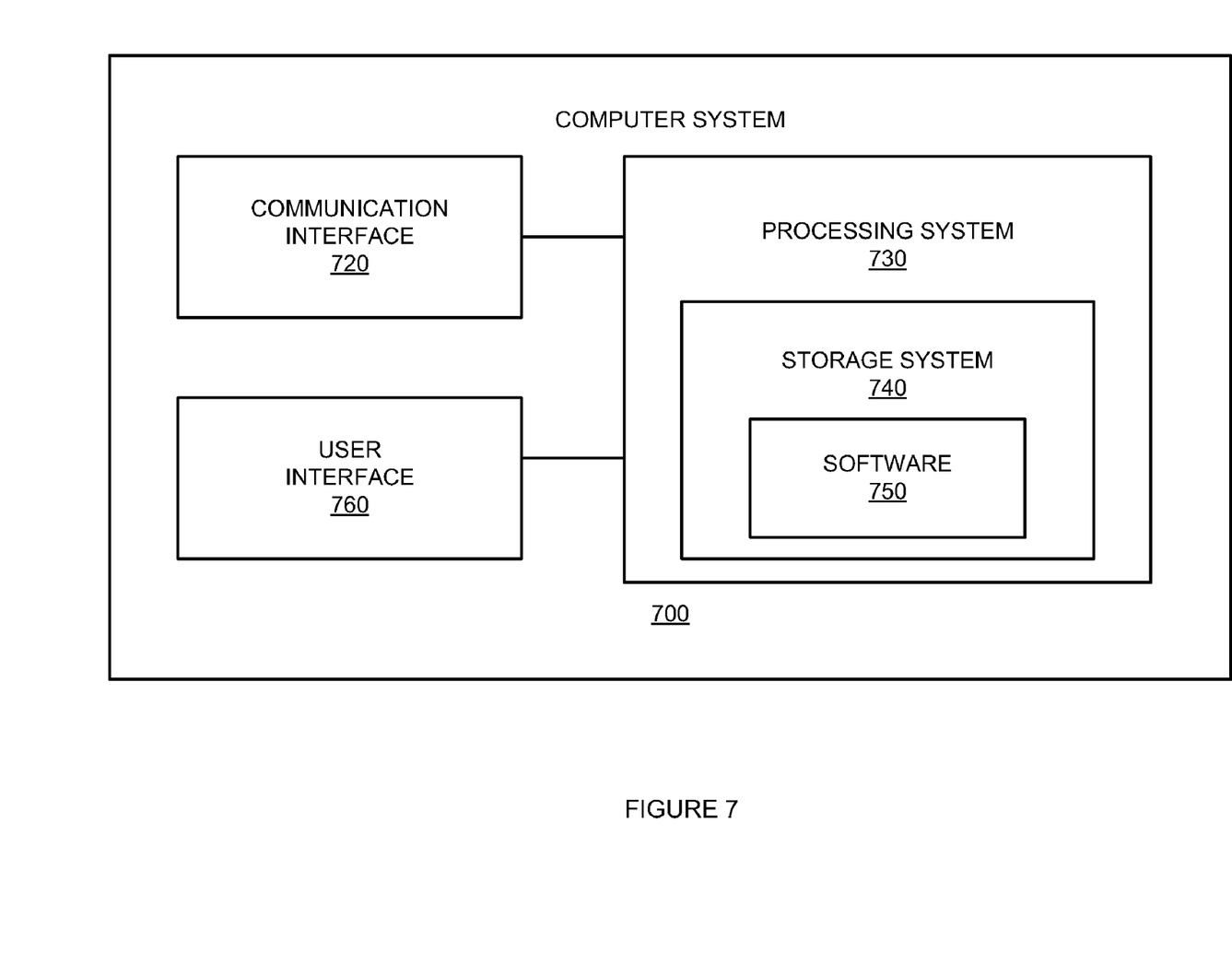
FIG. 7 is a block diagram illustrating a computer system.

FIG. 7 illustrates a block diagram of a computer system. Computer system 700 includes communication interface 720, processing system 730, and user interface 760. Processing system 730 includes storage system 740. Storage system 740 stores software 750. Processing system 730 is linked to communication interface 720 and user interface 760. Computer system 700 could be comprised of a programmed general-purpose computer, although those skilled in the art will appreciate that programmable or special purpose circuitry and equipment may be used. Computer system 700 may be distributed among multiple devices that together comprise elements 720-760.

Communication interface 720 could comprise a network interface, modem, port, transceiver, or some other communication device. Communication interface 720 may be distributed among multiple communication devices. Processing system 730 could comprise a computer microprocessor, logic circuit, or some other processing device. Processing system 730 may be distributed among multiple processing devices. User interface 760 could comprise a keyboard, mouse, voice recognition interface, microphone and speakers, graphical display, touch screen, or some other type of user device. User interface 760 may be distributed among multiple user devices. Storage system 740 could comprise a disk, tape, integrated circuit, server, or some other memory device. Storage system 740 may be distributed among multiple memory devices.

Processing system 730 retrieves and executes software 750 from storage system 740. Software 750 may comprise an operating system, utilities, drivers, networking software, and other software typically loaded onto a computer system. Software 750 could comprise an application program, firmware, or some other form of machine-readable processing instructions. When executed by processing system 730, software 750 directs processing system 730 to operate as described herein.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication system, the method comprising:
   receiving, by a node of the communication system, a registration message from a device that identifies a location of the device and a device identifier;
   transmitting, by the node of the communication system, the location of the device to a location database;
   receiving, by the node of the communication system, a watch list that identifies a plurality of devices;
   receiving, by the node of the communication system, a session request from the device for a session;
   processing, by the node of the communication system, the device identifier of the device to determine if the device is one of the plurality of devices;
   transferring, by the node of the communication system, the location of the device to a location reporting system, when the device is one of the plurality of devices; and
   transferring, by the node of the communication system, digitized audio of the session to a location reporting system, when the device is one of the plurality of devices and the session request comprises a request for an audio session.

2. The method of claim 1 wherein the location of the device is an association between the device and a base station.

3. The method of claim 2, wherein the registration message is received by a WiMAX specified ASN and is transmitted to a AAA system.

4. The method of claim 3, wherein the AAA system transfers the location of the device to a location reporting system.

5. The method of claim 4, wherein the location reporting system is an interface to a law enforcement agency system.

6. The method of claim 4, wherein the location reporting system is a billing system.

7. A communication system, comprising:
   a first system that receives a registration message from a device that identifies a location of the device and a device identifier;
   a second system that receives the device identifier and the location of the device and transmits the location of the device to a location database,
   wherein the first system is configured to
      receive a watch list that identifies a plurality of devices,
      receive a session request from the device for a session, and
      process the device identifier to determine if the device is a one of the plurality of devices,
   the second system is configured to transfer the location of the device to a location reporting system, when the device is one of the plurality of devices, and
   the second system is further configured to transfer digitized audio of the session to a location reporting system, when the device is one of the plurality of devices and the session request comprises a request for an audio session.

8. The communication system of claim 7, wherein the location of the device is an association between the device and a base station.

9. The communication system of claim 8, wherein the first system is a WiMAX specified ASN and the second system is an AAA system.

10. The communication system of claim 8, wherein the first system sends a notice to the location reporting system indicating that the device is one of the plurality of devices.

11. The communication system of claim 10, wherein the location reporting system is an interface to a law enforcement agency system.

12. The communication system of claim 10, wherein the location reporting system is a billing system.

13. The communication system of claim 9, wherein the first system sends a notice to the location reporting system indicating that the device is one of the plurality of devices.

14. A program storage device readable by a machine, tangibly embodying a program of instructions executable by the machine to perform method steps operating a communication system, the method comprising:
   receiving a registration message from a device that identifies a location of the device and a device identifier;
   transmitting the location of the device to a location database;
   receiving a watch list that identifies a plurality of devices;
   receiving a session request from the device for a session;
   processing the device identifier to determine if the device is a one of the plurality of devices;
   transferring the location of the device to a location reporting system, when the device is one of the plurality of devices; and
   transferring digitized audio of the session to a location reporting system, when the device is one of the plurality of devices and the session request comprises a request for an audio session.

15. The program storage device of claim 14 wherein the location of the device is an association between the device and a base station.

16. The program storage device of claim 15, wherein the registration message is received by a WiMAX specified ASN and is transmitted to a AAA system.

17. The program storage device of claim 16, wherein the AAA system transfers the location of the device to a location reporting system.

18. The program storage device of claim 17, wherein the location reporting system is an interface to a law enforcement agency system.

19. The program storage device of claim 17, wherein the location reporting system is a billing system.

20. The program storage device of claim 14, the method further comprising:
   transferring an indication that the device is one of the plurality of devices to the location reporting system.

* * * * *